Jan. 27, 1959

A. J. ANNIS 2,871,438

POWER PLANT

Filed March 11, 1958

2 Sheets-Sheet 1

INVENTOR.
ANDREW J. ANNIS
BY Walter G. Finch
ATTORNEY

Jan. 27, 1959   A. J. ANNIS   2,871,438
POWER PLANT

Filed March 11, 1958   2 Sheets-Sheet 2

INVENTOR
ANDREW J. ANNIS
BY Walter G. Finch
ATTORNEY though the paired, normally-closed contacts 110 and 111 of the relay 109, and a reversing switch 112. The motor is thus connected in electrical parallel with whatever external device is normally electrically driven by the generator, represented by the resistance 114.

United States Patent Office 2,871,438
Patented Jan. 27, 1959

2,871,438

POWER PLANT

Andrew J. Annis, Fort Lauderdale, Fla.

Application March 11, 1958, Serial No. 720,593

9 Claims. (Cl. 322—13)

This invention relates generally to the combination of a driving unit, a variable coupling mechanism, and a driven unit, and more particularly it pertains to means for providing feedback interaction between the driven unit and the other two devices of the combination.

The variable coupling mechanism to which reference is made above is described in its original embodiment in my United States Letters Patent No. 2,795,971 for "Power Transmission," issued on June 18, 1957.

Although the novel constructions now to be disclosed are primarily described with reference to the aforesaid "Power Transmission," and to an electric motor and generator, it is to be understood that certain of the general arrangements may find broader application, and that restriction of the exact devices described is not intended. For example, the electric circuits and devices described in combination are obviously adaptable to hydraulic, pneumatic, mechanical and electrical embodiments.

In the original and in the improved embodiment described in a co-pending patent application, Serial Number 719,419, filed March 5, 1958, for an effective and useful device comprising a geared mechanism working in conjunction with centrifugal type counterpoises for smoothly and flexibly transmitting power mechanically.

A principal object of this invention is to increase the utility of the power transmission and to broaden its field of application by adapting it for certain uses with a motor and a generator through a unique combination of coupling and control.

Another object of this invention is to use inertial energy of the power transmission to prolong automatically its synchronized operation with the said driving and driven means.

And another object of this invention is to provide means to extend the service life of the power transmission when used with driving and driven means, by avoidance of shock loading within the device.

Figure 1:
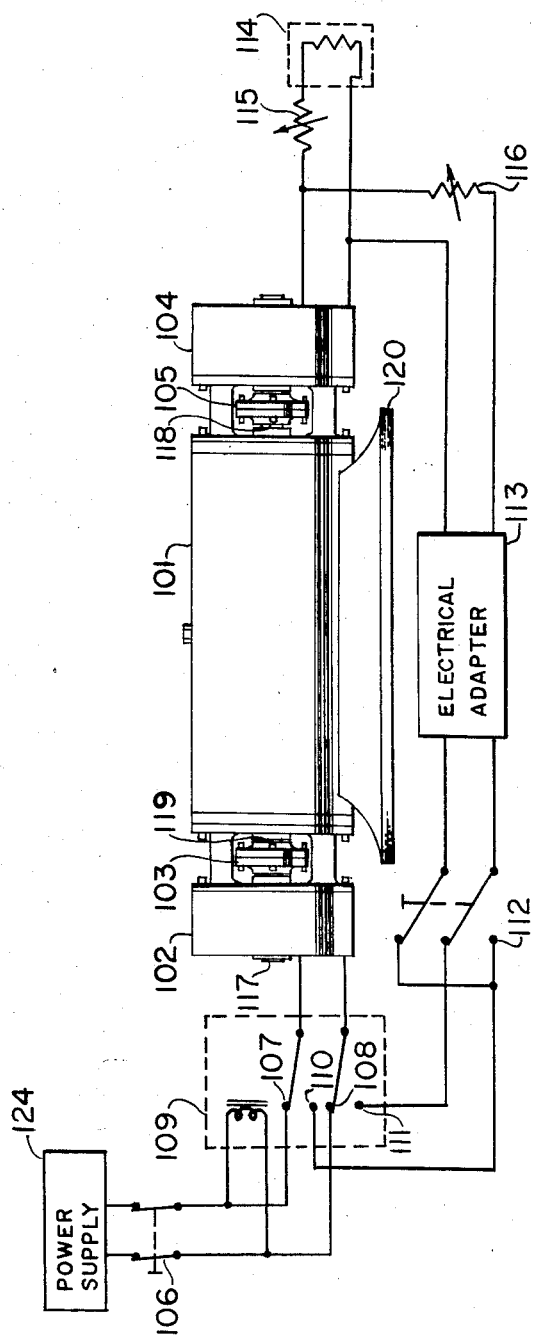
Figure 3:
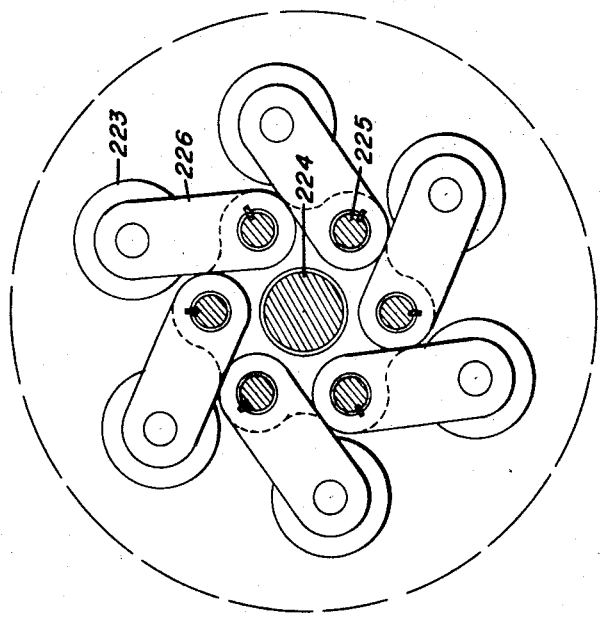
Figure 2:
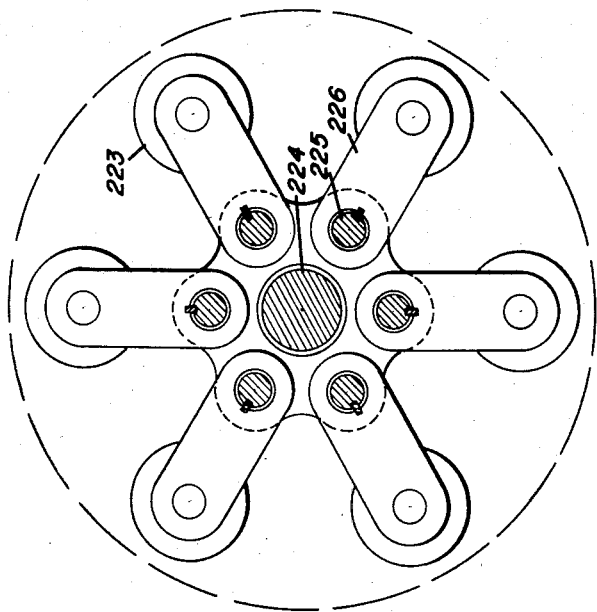

These and other objects and advantages of this invention will become more readily understood from the accompanying specification and drawings in which:

Fig. 1 is a schematic mechanical and electrical diagram of the general arrangement of the invention, or device as a whole; and Figs. 2 and 3 show, partly in section, two positions of an internal mechanism of the power transmission shown in Fig. 1.

Referring now to Fig. 1, the power transmission 101 is driven by an electric motor 102, through a mechanical coupling 103 and, in turn, drives an electric generator 104 through a second coupling 105. The power transmission 101, motor 102, and generator 104 are mounted on a base 120. The motor 102 is connected to a supply of electricity, not shown, such as a battery or electric power line, through a line switch 106, and paired, normally-open contacts 107 and 108 of a solenoid operated double pole, double throw relay 109. It is to be noted that the relay solenoid is connected through one of these contacts to the electric supply. The motor 102 is alternatively connected electrically to the generator 104 through paired, normally-closed contacts 110 and 111 of the relay 109, and a reversing switch 112. The motor is thus connected in electrical parallel with whatever external device is normally electrically driven by the generator, represented by the resistance 114.

Variable resistance 115 and 116 may be placed in series with both of the parallel circuits leading from the generator 104, and an electrical adapter 113 may be placed in series with the generator-to-motor circuit, if needed, as will be discussed.

Operation of the device as a whole, as shown in Fig. 1, will now be described. When the line switch 106 is closed, relay 109 connects the external source of electricity to the motor 102, causing the motor shaft 117 to rotate and drive the power transmission input shaft 119.

The resultant rotation of the power transmission output shaft 118 drives the generator 104. Electrical output of the generator is at this time wholly supplied to the device 114 which it normally drives.

However, when the device as a whole of Fig. 1 is in steady operation, and the line switch 106 is opened, relay 109 automatically opens its paired contacts 107 and 108, and closes its paired contacts 110 and 111 and the motor 102 is driven by the generator 104, in measure as electric current is made available by inertial forces of the power transmission acting to turn the generator 104, and by the inertial forces of the generator acting to turn it, and also in measure as determined by the settings of the variable resistances which may be set to proportionate available current between devices 114 and 102.

Energy losses in the electrical adapter 113, if this is used, must be taken into account, and the reversing switch 112 must, of course, be correctly positioned. The electrical adapter 113 may be any of the devices well known in the art for converting electric current from A. C. to D. C. or the reverse, or for raising or lowering voltage, or for matching circuit impedances, or changing frequency, or a combination of these, as required by the installation, for example, in the circuit of Fig. 1, if the motor 102 operates from direct current, and if the output of the generator 104 is alternating current of about the voltage required to operate the motor 102, then the electrical adapter unit 113 need only be a rectifier.

If the feedback electric circuit from the generator 104 to the motor 102, just described, is of efficient construction and in correct adjustment, the motor 102 is enabled to maintain its normal running rotational phase relation with the power transmission 101 and generator 104, or to "keep up" with them in rotation. Because of design principles inherent in the power transmission, as explained in the referenced patent, certain advantages accrue from maintaining this phase relation between the driving motor 102, and the power transmission 101 and generator 104.

Briefly, as explained in its patent, the "power transmission" essentially consists of an output shaft which turns a planetary gear train. The latter is torsionally linked to the output shaft of the transmission in two ways; namely, through direct gearing, and through a set of shafts shared in common with a counterpoise assembly which is geared to the output shaft.

Fig. 2 shows an axial view of such an assembly of counterpoises 223, the output shaft 224, and the shafts 225 which are shared in common with the planetary gear train.

A major result of this novel arrangement is the allowance of limited relative rotation between the input and output shafts 119 and 118, respectively, in Fig. 1, of the "power transmission." Fig. 3 gives an indication of what limits this rotation. In the Fig. 3, extreme load between the input and output shafts has, through geared connection, caused the counterpoises 223 to be rotated until the motion of their links 226 was brought to a stop by contact between the various links. This, in turn, stops relative motion between the input and output shafts, which now rotate as one.

Obviously, extreme loading of the output shaft in the opposite direction will find a corresponding limit in the counterpoise links, with the result that the input and output shafts will again commence to rotate as one.

Now, the normal relative position for these two shafts during operation is about halfway between the limits just described, since centrifugal force holds the counterpoises in the mid-position, as shown in Fig. 2. In the light of this explanation, therefore, it is to be realized that unduly heavy loads of the output shaft of the power transmission from positive relative rotation to zero relative rotation can result in undesirable loading of the internal mechanisms of the transmission and of the driving and driven accessories.

This condition can most readily occur through excessively heavy loading of the driven shaft. This is important in enabling the drive motor to maintain its shaft position relative to the driven units after external power is shut off to produce sufficient power in the transmission to give smooth power from the power plant.

This is made possible, as shown in drawing Fig 1, by the opposite reactional force generated in the transmission, held and controlled by the counterpoises, not by the frame of the transmission.

It will be seen from the foregoing that a versatile and flexible power plant arrangement is provided which is characterized in normal operation by a smooth and flexible generator drive, which can automatically switch over to, and usefully apply, electrical current generated by internal inertia after external power is shut off.

Obviously, many other modifications and variations of the present invention are possible in the light of the above teachings. It is therefore to be understood that within the scope of the appended claims, the invention may be practiced otherwise than as specifically described.

What is claimed is:

1. In an electro-mechanical device for generating electric current, in combination, an electric motor, an extraneous electric power supply, wiring means including a line switch to connect said electric motor to said extraneous electric power supply, a variable mechanical rotation transmission, said electric motor being disposed through mechanical coupling means to drive said variable mechanical rotation transmission, and electric generator, other mechanical coupling means mechanically coupling said transmission to said generator, an electrical supply line connected to said generator supplying electricity from said generator to an extraneous electrical device, and automatic means including an electrically actuated relay and an electric supply to connect said generator to said motor electrically when said extraneous power supply is disconnected from said motor to the end that inertially generated electricity is supplied to said motor from said generator to operate said motor and to prevent stoppage of said motor at a rate faster than stoppage of said generator.

2. An arrangement as recited in claim 1, with additionally electrical adapter means in said electrical supply line to make the electric output of said generator suitable for running said motor.

3. An arrangement as recited in claim 1, with additionally a variable electrical control device in said electric supply line to control passage of electric current.

4. An arrangement as recited in claim 1, and a reversing switch in the said electric supply line.

5. An arrangement as recited in claim 1, in which the said relay is a solenoid relay, with sets of normally-open and normally-closed contacts, the solenoid and the said electric motor being connected through the normally-open contacts to the said electric power supply, and the said motor being electrically connected through the normally closed contacts to the said generator.

6. An arrangement as recited in claim 1, in which said electric power supply, motor, generator, and control circuit are hydraulic devices for generating hydraulic pressure.

7. An arrangement as recited in claim 1, in which said electric power supply, motor, generator, and control circuit are pneumatic devices for generating pneumatic pressure.

8. An arrangement as recited in claim 1, in which said electric power supply, motor, generator, and control circuit are electrical devices for generating electrical pressure.

9. An arrangement as recited in claim 1, in which said electrical power supply, motor, generator, and control circuit are mechanical devices for generating mechanical pressure.

<center>No references cited.</center>